US012767228B2

(12) United States Patent
Park et al.

(10) Patent No.: US 12,767,228 B2
(45) Date of Patent: Oct. 20, 2026

(54) FRONT-END MODULE FRAME OF A VEHICLE

(71) Applicants: HYUNDAI MOTOR COMPANY, Seoul (KR); KIA CORPORATION, Seoul (KR); HYUNDAI MOBIS CO., LTD., Seoul (KR)

(72) Inventors: Tae Ou Park, Seongnam-si (KR); Do Hoi Kim, Sejong-si (KR); Jae Sup Byun, Seongnam-si (KR); Jang Ho Kim, Seoul (KR)

(73) Assignees: HYUNDAI MOTOR COMPANY, Seoul (KR); KIA CORPORATION, Seoul (KR); HYUNDAI MOBIS CO., LTD., Seoul (KR)

( * ) Notice: Subject to any disclaimer, the term of this patent is extended or adjusted under 35 U.S.C. 154(b) by 421 days.

(21) Appl. No.: 18/500,429

(22) Filed: Nov. 2, 2023

(65) Prior Publication Data

US 2024/0391530 A1 Nov. 28, 2024

(30) Foreign Application Priority Data

May 24, 2023 (KR) ........................ 10-2023-0067083

(51) Int. Cl.
*B60R 19/34* (2006.01)
*B60R 19/18* (2006.01)
(Continued)

(52) U.S. Cl.
CPC ............ *B62D 21/152* (2013.01); *B60R 19/18* (2013.01); *B60R 19/34* (2013.01); *B62D 25/085* (2013.01)

(58) Field of Classification Search
CPC .... B62D 21/152; B62D 21/155; B62D 25/04; B62D 25/085; B62D 29/004; B60R 19/18; B60R 19/34
(Continued)

(56) References Cited

U.S. PATENT DOCUMENTS

| | | | | |
|---|---|---|---|---|
| 4,410,208 A * | 10/1983 | Mulso, Jr. | ............... | B60R 19/34 180/271 |
| 6,382,709 B1 * | 5/2002 | Chirifu | ................ | B62D 29/008 276/29 |

(Continued)

FOREIGN PATENT DOCUMENTS

| | | |
|---|---|---|
| KR | 101277861 B1 | 6/2013 |
| KR | 20200128922 A | 11/2020 |

*Primary Examiner* — Gregory A Blankenship
(74) *Attorney, Agent, or Firm* — Lempia Summerfield Katz LLC

(57) ABSTRACT

A front-end module frame of a vehicle includes a lower member disposed at a front lower portion of the vehicle and formed to extend in a width direction of the vehicle. In particular, the lower member has opposite ends connected to front ends of a front subframe of the vehicle. The front-end module frame further includes a front bumper beam formed to extend in the width direction and connected to the lower member in a height direction of the vehicle, and an upper member disposed at a front upper portion of the vehicle. The front bumper beam has opposite ends connected to front ends of front side members, and the upper member is formed to extend in the width direction and connected to the front bumper beam in the height direction. The upper member has opposite ends bent toward the vehicle and connected to a fender apron member.

17 Claims, 8 Drawing Sheets

(51) Int. Cl.
*B62D 21/15* (2006.01)
*B62D 25/08* (2006.01)

(58) Field of Classification Search
USPC .......................... 296/187.09, 193.09, 203.02
See application file for complete search history.

(56) References Cited

U.S. PATENT DOCUMENTS

| | | | | |
|---|---|---|---|---|
| 8,770,639 | B2 * | 7/2014 | Blumel | B60R 19/18 293/133 |
| 9,630,655 | B1 * | 4/2017 | Lee | B62D 29/046 |
| 10,486,745 | B1 * | 11/2019 | Kim | B60R 19/18 |
| 11,325,648 | B2 | 5/2022 | Kim | |
| 12,084,113 | B2 * | 9/2024 | Kang | B62D 25/08 |
| 12,139,085 | B2 * | 11/2024 | Tashiro | B62D 21/15 |
| 2005/0022965 | A1 * | 2/2005 | Mori | F28F 9/002 165/76 |
| 2005/0067860 | A1 * | 3/2005 | Makita | B60R 19/34 296/203.02 |
| 2006/0213640 | A1 * | 9/2006 | Matsuoka | B62D 25/084 180/68.4 |
| 2007/0277926 | A1 * | 12/2007 | Naughton | B62D 29/004 156/243 |
| 2008/0079288 | A1 * | 4/2008 | Henderson | B62D 21/12 296/187.09 |
| 2009/0026805 | A1 * | 1/2009 | Benvenuto | B29C 45/1639 296/192 |
| 2010/0026049 | A1 * | 2/2010 | Bierjon | B62D 25/084 296/193.09 |
| 2010/0078149 | A1 * | 4/2010 | Yoshimitsu | B62D 25/084 296/193.09 |
| 2010/0163324 | A1 * | 7/2010 | Jyoutaki | B60K 11/04 165/149 |
| 2011/0115241 | A1 * | 5/2011 | Gonin | B60R 19/12 293/146 |
| 2011/0221213 | A1 * | 9/2011 | Riviere | B62D 25/084 293/132 |
| 2011/0298244 | A1 * | 12/2011 | Ballesteros | B29C 45/14344 264/241 |
| 2011/0304174 | A1 * | 12/2011 | Iammarino | B62D 21/152 296/187.09 |
| 2012/0248819 | A1 * | 10/2012 | Okamura | B60R 19/12 296/187.1 |
| 2015/0251613 | A1 * | 9/2015 | Mori | B62D 21/152 293/133 |
| 2015/0343973 | A1 * | 12/2015 | Stoenescu | B60R 19/12 293/133 |
| 2019/0071130 | A1 * | 3/2019 | Ginja | B62D 29/008 |
| 2019/0143920 | A1 * | 5/2019 | Nakamoto | B60K 11/04 296/193.09 |
| 2019/0300062 | A1 * | 10/2019 | Yoo | B62D 29/041 |
| 2020/0231006 | A1 * | 7/2020 | Bonnet | B60C 9/2009 |
| 2020/0324820 | A1 * | 10/2020 | Kim | B62D 25/08 |
| 2020/0353986 | A1 | 11/2020 | Kim | |
| 2022/0204086 | A1 * | 6/2022 | Anzai | B62D 27/00 |
| 2022/0306206 | A1 * | 9/2022 | Kim | B62D 25/08 |
| 2023/0105286 | A1 * | 4/2023 | Tashiro | B60R 19/12 293/133 |
| 2024/0227708 | A1 * | 7/2024 | Park | B60R 19/023 |
| 2024/0308445 | A1 * | 9/2024 | Sohn | B60G 17/018 |
| 2024/0351637 | A1 * | 10/2024 | Mangold | B62D 21/152 |
| 2024/0391530 | A1 * | 11/2024 | Park | B62D 25/085 |
| 2025/0346297 | A1 * | 11/2025 | Taniguchi | B62D 21/155 |

* cited by examiner

FRONT-END MODULE FRAME OF A VEHICLE

CROSS-REFERENCE TO THE RELATED APPLICATION

This application claims priority to and the benefit of Korean Patent Application No. 10-2023-0067083, filed on May 24, 2023, the disclosure of which is incorporated herein by reference.

BACKGROUND

1. Field

The present disclosure relates to a front-end module frame of a vehicle, and more particularly to a front-end module frame of a vehicle capable of securing a load path against vehicle frontal collision.

2. Description of the Related Art

Recently, with the expansion of electric vehicles and increasing societal awareness of environmental issues, as well as the rise in single-person households, the concept of micro-vehicles for personal mobility is significantly growing. Meanwhile, in the case of micro-vehicles, a front overhang has a very short design, so an impact absorption space is significantly insufficient in the event of vehicle collision.

When an impact absorption space of a vehicle front structure is insufficient, all impact caused by vehicle collision is transmitted to an occupant. Accordingly, the risk of injury to the occupant increases.

Meanwhile, in the case of small cars, such as compact cars, a fender apron member is designed in a straight shape, making it easier to respond to frontal collision with a vehicle in front of an ego vehicle through a crash box configuration. On the other hand, in the case of medium-sized or large-sized vehicles, since a fender apron member is bent and connected to a front portion of a front side member, it is difficult to provide a space for a crash box configuration. Accordingly, it is difficult to respond to frontal collision with a vehicle in front of an ego vehicle.

In addition, an upper member forming a front-end module frame of a conventional vehicle has a frame made of steel or plastic in the form of an open cross section, making it difficult to respond to vehicle frontal collision.

The information disclosed in this Background section is provided solely to enhance the understanding of the general background of the present disclosure, and should not be taken as an acknowledgement or any form of suggestion that this information forms the related art already known to a person skilled in the art.

SUMMARY

The present disclosure provides a front-end module frame of a vehicle that is capable of securing a load path against frontal collision of the vehicle. This is achieved through a structure in which opposite ends of an upper member located at an upper portion of a front-end module frame of the vehicle are bent toward the vehicle and connected to a fender apron member of the vehicle, according to an embodiment of the present disclosure.

The objects of the present disclosure are not limited to the above-mentioned object, and other objects not yet mentioned should be clearly understood by those having ordinary skill in the art to which the present disclosure pertains from the following descriptions.

In one embodiment of the present disclosure, a front-end module frame of a vehicle includes: a front bumper beam formed to extend in a width direction of the vehicle, and an upper member formed to extend above the front bumper beam in the width direction of the vehicle. In particular, the front bumper beam has opposite ends respectively connected to front ends of front side members of the vehicle, and the upper member is formed of a plastic structure covering a steel closed cross-section member.

In another embodiment, the front-end module frame may further include a lower member disposed at a lower portion of a front side of the vehicle and formed to extend in the width direction of the vehicle. The lower member has opposite ends respectively connected to front ends of a front subframe of the vehicle. The front bumper beam may be connected to the lower member in a height direction of the vehicle.

In one embodiment, each connection part of the front bumper beam may be connected to a corresponding one of the front ends of the front side members so as to face each other, thereby enabling the front bumper beam and the front side members to form a front load path.

In one embodiment, the front-end module frame may further include a plurality of connection brackets connected to the front bumper beam in a height direction of the vehicle.

One of the connection brackets may be formed to extend downwards from a central portion of the upper member and the rest of the connection brackets may be respectively formed to extend downwards from side portions thereof. In one embodiment, the connection bracket formed to extend from the central portion may be bolted to front and upper surfaces of the front bumper beam, and the connection brackets respectively formed to extend from the side portions may be bolted to upper and side surfaces of the front bumper beam.

The upper member may include a member formed of steel material and having a closed cross-section (hereinafter, referred to as a steel closed cross-section member) and the plastic structure injection-molded on the steel closed cross-section member by a molding method using injection molding. The steel closed cross-section member may be formed of a steel material, and the plastic structure may be formed of a rigid plastic material.

Each of the fender apron members may have a front end connected to a corresponding one of upper crash boxes, and each of the upper crash boxes may have a front end connected to a corresponding one of rear surfaces on opposite ends of the plastic structure.

The upper crash boxes may be formed of an upper impact absorption part having a columnar shape and an upper flange part formed at a rear end of the upper impact absorption part, and the upper flange part may be connected to the front end of the fender apron member.

The plastic structure, the upper impact absorption part, and the upper flange part may be integrally injection molded.

Each of the upper crash boxes may be aligned with a corresponding one of fender crash boxes in a longitudinal direction of the vehicle, thereby enabling the plastic structure, the upper crash boxes, and the fender crash boxes to form a front load path.

The upper crash box may have a rear end inserted into a front end of the fender crash box, and the rear end may be bolted laterally in a state of being inserted into the front end.

The front-end module frame may further include an insulator configured to allow a radiator to be connected to each of the lower member and the upper member, wherein the radiator dissipates heat generated by the vehicle and is disposed in the front bumper beam.

The plastic structure may have an insert nut formed to be integrated with a side portion thereof, and an upper portion of the radiator may be supported when the insulator is fastened to the insert nut.

The plastic structure may have an insert nut formed to be integrated with a central portion thereof, and a vehicle hood may be fixed to a hood latch and supported from below when the hood latch is fastened to the insert nut.

BRIEF DESCRIPTION OF THE DRAWINGS

The above and other objects, features and other advantages of the present disclosure should be more clearly understood from the following detailed description taken in conjunction with the accompanying drawings, in which.

DETAILED DESCRIPTION

Figure 1:
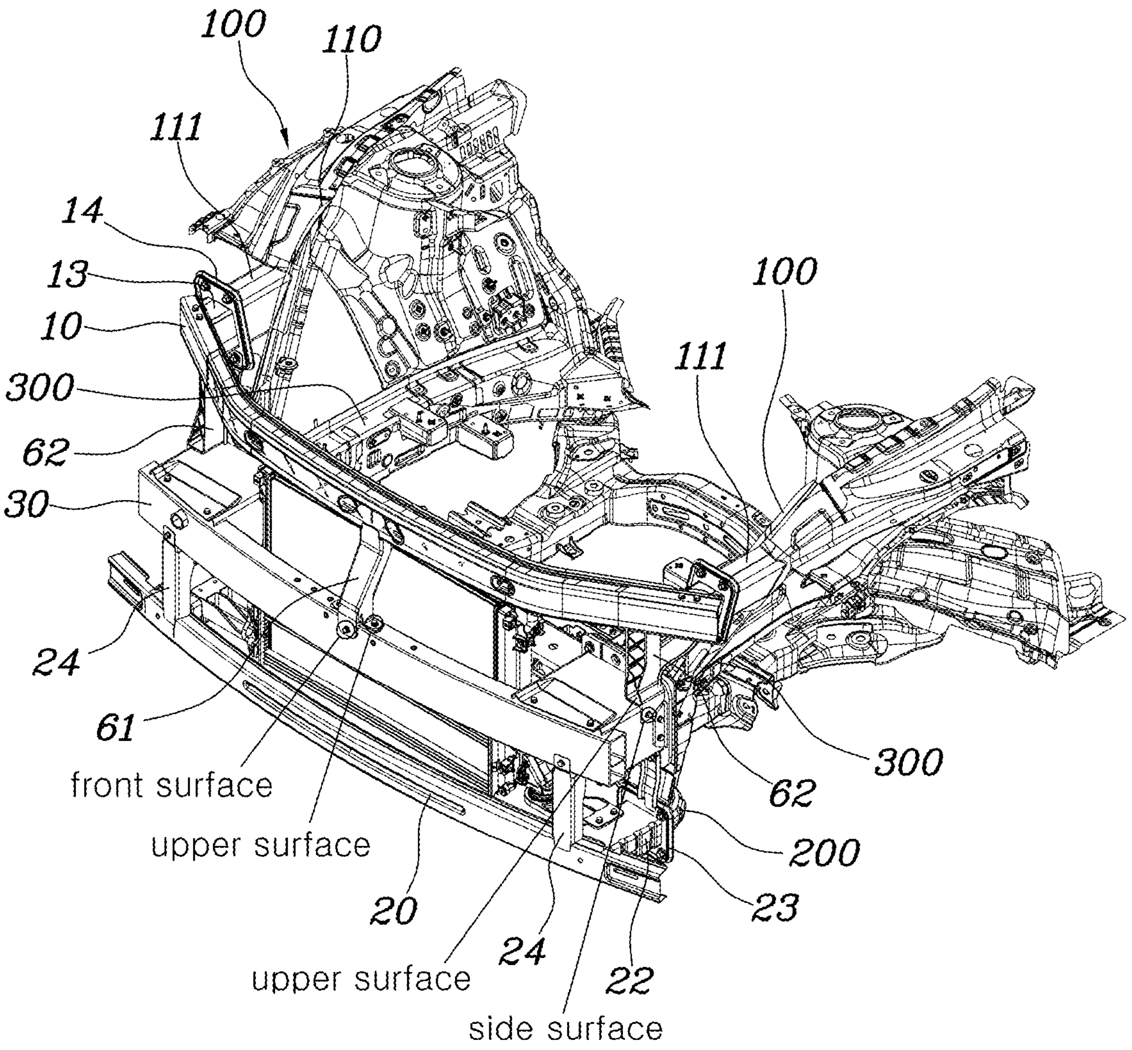
FIG. 1 is a view showing a front-end module frame of a vehicle according to an embodiment of the present disclosure.

Reference is now made in detail to the embodiments of the present disclosure, examples of which are illustrated in the accompanying drawings. Similar components are denoted by the same reference numerals, and overlapping descriptions thereof has been omitted.

Suffixes "module" and "unit" for configuration elements used in the following descriptions are given or mixed in consideration of only facilitation of description and do not have meanings or functions discriminated from each other.

In describing the embodiments disclosed in this specification, when it is determined that a detailed description of a related known technique may obscure the gist of the embodiments disclosed herein, the detailed description thereof has been omitted. Further, it should be understood that the accompanying drawings are only intended to facilitate understanding of the embodiments disclosed herein, the technical idea disclosed herein is not limited by the accompanying drawings. Additionally, the accompanying drawings should be understood as including all modifications, equivalents, and substitutes that fall within the spirit and technical scope of the present disclosure. Terms such as "first" and/or "second" may be used to describe various components, but the components are not limited by the terms. The terms are used only for the purpose of distinguishing one component from other components.

When one component is referred to as being "connected" or "joined" to another component, the one component may be directly connected or joined to the other component, but it should be understood that other components may be present therebetween. On the other hand, when the one component is referred to as being "directly connected to" or "directly in contact with" the other component, it should be understood that other components are not present therebetween.

Singular forms are intended to include plural forms as well, unless the context clearly indicates otherwise.

When a component, device, element, or the like of the present disclosure is described as having a purpose or performing an operation, function, or the like, the component, device, or element should be considered herein as being "configured to" meet that purpose or to perform that operation or function.

It should be further understood that the terms "comprises", "includes", and/or "has", when used in the present application, specify the presence of stated features, integers, steps, operations, elements, components, or combinations thereof, but do not preclude the presence or addition of one or more other features, integers, steps, operations, elements, components, or combinations thereof.

An embodiment of the present disclosure provides a front-end module frame of a vehicle configured to secure a load path against vehicle frontal collision in a structure in which opposite ends of an upper member located at an upper portion of the front-end module frame of the vehicle are bent toward the vehicle side and connected to a fender apron member of the vehicle.

FIG. 1 is a view showing the front-end module frame of the vehicle according to an embodiment of the present disclosure. FIG. 1 mainly shows components related to the present embodiment, and it goes without saying that fewer or more components than those in FIG. 1 may be provided in implementing a front-end module frame of an actual vehicle.

Referring to FIG. 1, the front-end module frame of the vehicle according to the embodiment may include an upper member 10, a lower member 20, and a front bumper beam 30.

First, the lower member 20 forming the front-end module frame of the vehicle is described below. The lower member 20 may be disposed at a lower portion of the front side of the vehicle and may have opposite ends respectively connected to the front ends of a front subframe 200 of the vehicle. According to this structure, the lower member 20 first receives impact force in the event of vehicle frontal collision, and transmits the received impact force to the front bumper beam 30 and the upper member 10 to be described later.

Meanwhile, lower crash boxes 22 and 23 may be connected to each of the rear surfaces of the opposite ends of the lower member 20, thereby respectively serving as a lower impact absorption part 22 and a lower flange part 23. The lower impact absorption part 22 is formed in a columnar shape and configured to be crushed in the longitudinal direction of the vehicle in the event of vehicle frontal collision, thereby making it possible to alleviate impact force. In addition, the lower flange part 23 may be formed at the rear end of the lower impact absorption part 22 and connected to the front end of the front subframe 200. Through this configuration, impact force may be more easily transmitted from the lower member 20 to the front subframe 200 in the event of vehicle frontal collision.

In addition, the front bumper beam 30 may extend in the width direction of the vehicle and may be connected to the lower member 20 in the height direction of the vehicle. Opposite sides of the front bumper beam 30 may extend toward the rear of the vehicle and may be respectively connected to the front ends of front side members 300 of the vehicle. In this case, the front portion of the front bumper beam 30 may be connected to the lower member 20 in the vertical direction through a lower front bracket 24.

The rear connection portion of the front bumper beam 30 is connected to the front end of the front side member 300 so as to face each other. In this manner, the front bumper beam 30 and the front side member 300 may obtain a configuration of a front load path. According to the configuration of the front load path, in the event of vehicle frontal collision, impact transmitted from the lower member 20 is transmitted to each of the front bumper beam 30 and the upper member 10, and the impact is further transmitted to each of the front side member 300 and a fender apron member 100.

Referring to FIG. 1, the fender apron member 100 has an inclined part 110 formed to allow the front end of the fender apron member 100 to be connected to the front side member 300 located below the fender apron member 100. In addition, a fender crash box 111 protrudes from the inclined part 110 toward the front of a vehicle, thereby making it possible to reduce and absorb impact energy transmitted from a vehicle to an occupant in the event of vehicle frontal collision. In this case, the fender crash box 111 is disposed to be aligned with upper crash boxes 13 and 14, so that the fender apron member 100 and the upper member 10 may be connected to each other. Through this configuration, impact transmitted to the upper member 10 is further transmitted to the fender apron member 100 in the event of vehicle frontal collision, thereby implementing a load path.

Next, the upper member 10 is disposed at an upper portion of the front of the vehicle and extends in the width direction of the vehicle. The upper member 10 is connected to the front bumper beam 30 in the height direction of the vehicle.

More specifically, opposite ends of the upper member 10 may be bent toward the vehicle side and respectively connected to the front ends of the fender apron member 100 of the vehicle. Through the shape of the upper member 10, components (e.g., upper crash boxes 13 and 14) may be adopted in a vehicle having a structure in which the fender apron member 100 is bent and connected to the front portion of the front side member 300, thereby making it possible to reduce impact energy transmitted from a vehicle to an occupant in the event of vehicle frontal collision.

In one embodiment, the upper crash boxes 13 and 14 may be provided and connected to the rear surfaces of the opposite ends of the upper member 10 such that the upper crash boxes 13 and 14 respectively serve as an upper impact absorption part 13 and an upper flange part 14. The upper impact absorption part 13 is formed in a columnar shape and is configured to be crushed in the longitudinal direction of the vehicle in the event of vehicle frontal collision, thereby making it possible to alleviate impact force. Furthermore, the upper flange part 14 may be formed at the rear end of the upper impact absorption part 13 and connected to the front end of the fender apron member 100. Through this configuration, impact force may be more easily transmitted from the upper member 10 to the fender apron member 100 in the event of vehicle frontal collision. The upper member 10 may be bolted and assembled in the longitudinal direction, the width direction, and the height direction of the vehicle through the upper flange part 14 and a plastic structure 12.

Additionally, a radiator 40 is provided inside the lower member 20, the front bumper beam 30, and the upper member 10. Further, the radiator 40 dissipates heat generated by the vehicle so as to cool an engine. In comparison with a conventional front-end module frame structure of a vehicle having a separate space in which the radiator 40 is mounted, in the present disclosure, the radiator 40 may be connected to the lower member 20 and the upper member 10 through an insulator instead of being mounted in a space for the radiator 40. The insulator is described below.

In one embodiment, a structure configured to absorb impact energy may be achieved by connecting three bridges to the front bumper beam 30 located in the middle of the front of the vehicle. Connection brackets 61 and 62 may be formed to extend downwards from a central portion of the upper member 10 and a side portion thereof, respectively. The connection brackets 61 and 62 may be connected to the front bumper beam 30 in the height direction of the vehicle. As shown in FIG. 1, the bracket 61 extending from the central portion may be bolted to the front surface of the front bumper beam 30 and the upper surface thereof. The connection bracket 62 extending from the side portion may be bolted to the upper surface of the front bumper beam 30 and the side surface thereof. Such a bridge structure has a rib lattice shape during plastic injection molding for a lightweight design, thereby forming a strong and lightweight structure.

Hereinafter, injection molding of the upper member 10 is described with reference to a molding method using injection molding.

Figure 2:
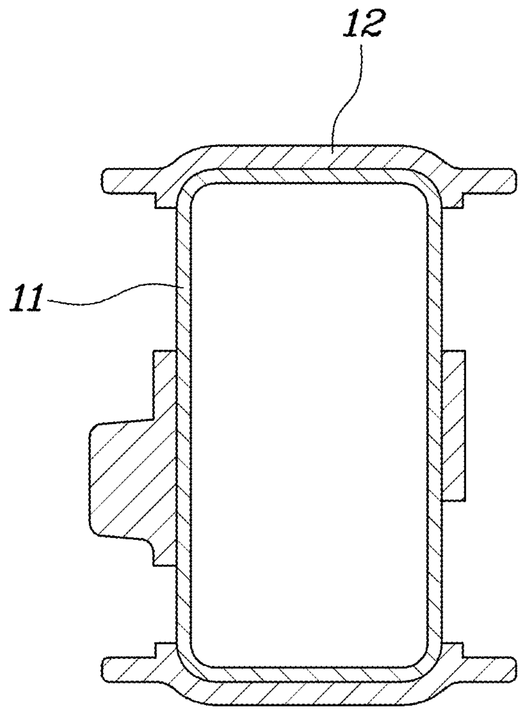
FIG. 2 is a view showing a cross section of an upper member according to the embodiment of the present disclosure.

FIG. 2 is a cross-sectional view of the upper member 10 according to the embodiment of the present disclosure.

Referring to FIG. 2, the upper member 10 may include a steel closed cross-section member 11 and a plastic structure 12. The steel closed cross-section member 11 is formed of a steel material having ultra-high tensile strength and forming a closed cross-section, and may have a bent shape corresponding to a vehicle design. In addition, since it is not easy to secure dimensions due to the nature of this molding method, a portion of the steel closed cross-section member 11 (i.e., the portion meeting a vehicle body) is insert-injected into a plastic mold, thereby securing dimensions of the seating surface. The plastic structure 12 may be injection-molded to cover the outside of the steel closed cross-section member 11 and formed of a rigid plastic material. In one embodiment, the plastic structure 12 is formed of a glass fiber reinforced plastic (GFRP) material having a value of PA6-GF50% among plastic materials.

The above-described front-end module frame of the vehicle may be assembled in the T direction, which is the longitudinal direction of the vehicle, so as to secure assembly performance of the front of the vehicle body on the assembly line. In addition, the left and right sides of the lower member 20, the left and right sides of the front bumper beam 30, and the left and right sides of the upper member 10 may be bolted through a fastening bolt 51.

Figure 3:
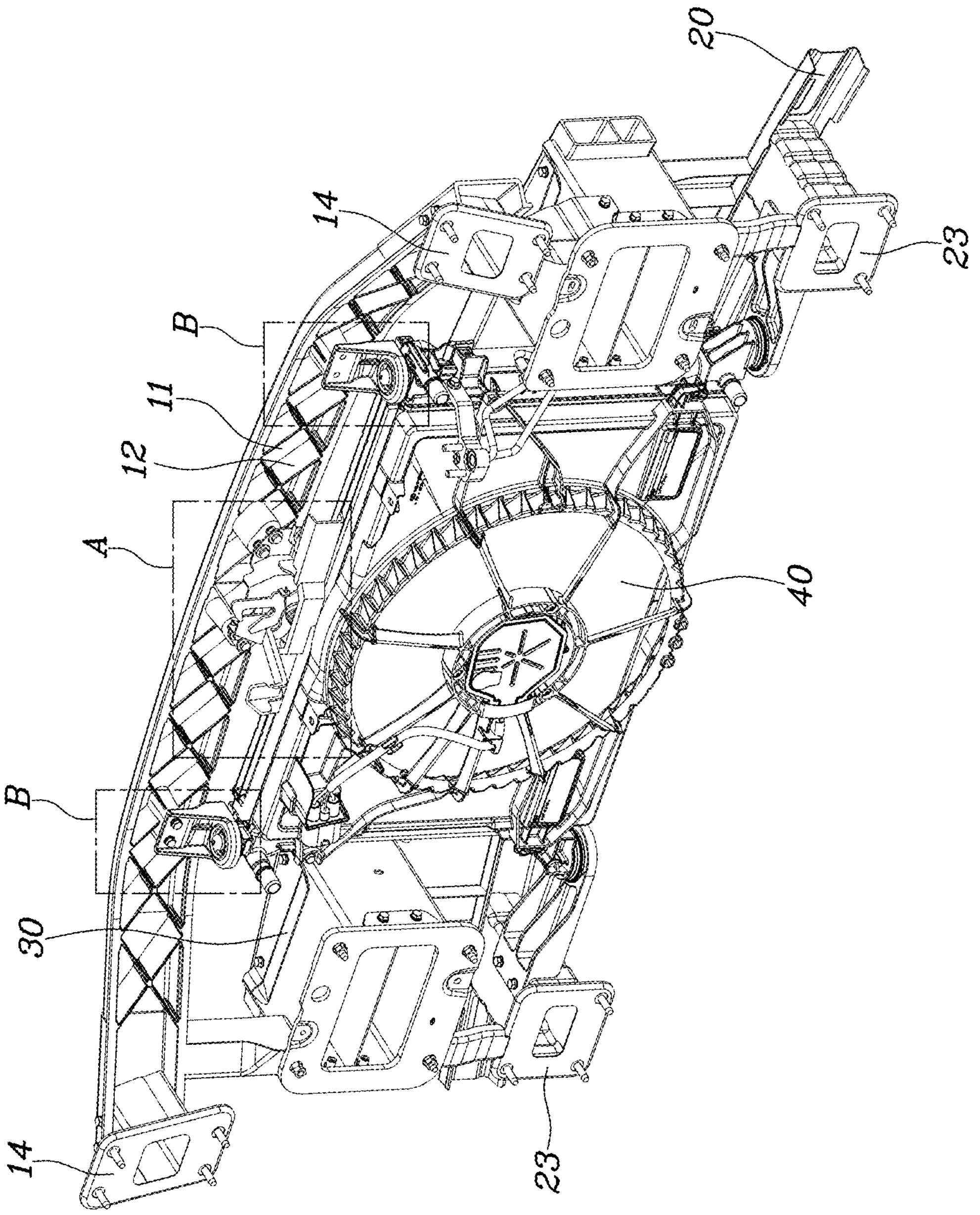
FIG. 3 is a view of the front-end module frame, seen from the rear, of the vehicle according to an embodiment of the present disclosure.

FIG. 3 is a rear view of the front-end module frame of the vehicle according to the embodiment of the present disclosure. Referring to FIG. 3, as described above, the rear surface of the upper member 10 forms an open inner space, and the injection-molded plastic structure 12 is disposed in the inner space of the upper member 10.

Hereinafter, each area shown in FIG. 3 is described with reference to FIGS. 4 and 5.

Figure 4:
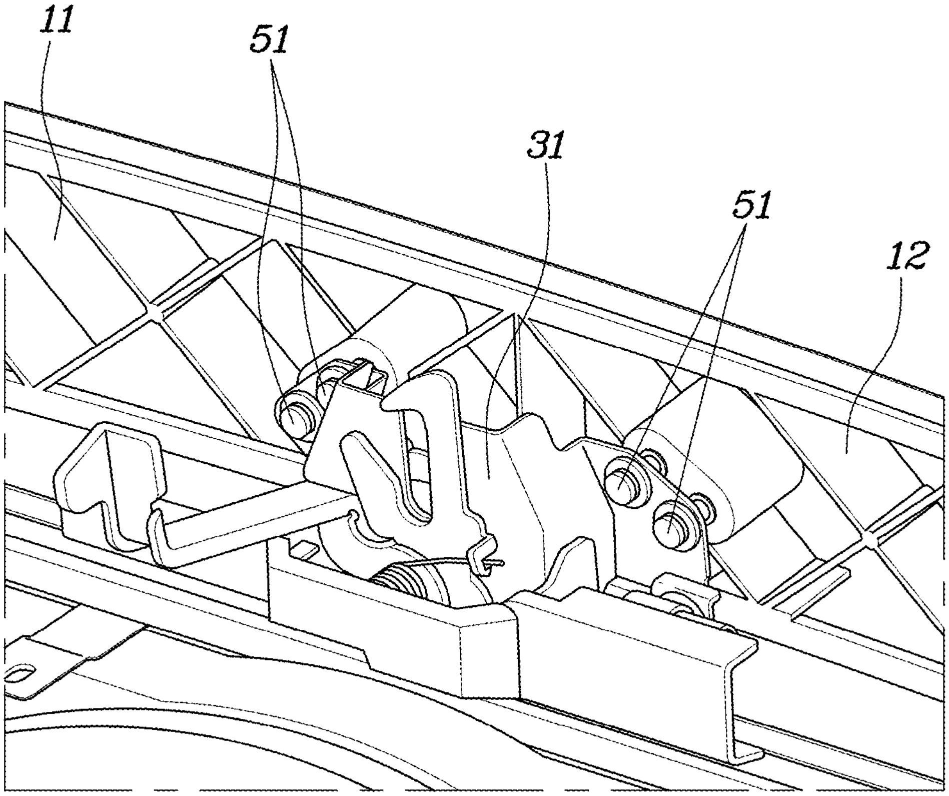
FIG. 4 is an enlarged view of an area A in FIG. 3 according to the embodiment of the present disclosure.

FIG. 4 is an enlarged view of an area A in FIG. 3.

Referring to FIG. 4, a hood latch 31 supporting a vehicle hood from below is shown. The hood latch 31 has a structure configured to hold the vehicle hood covering an engine compartment so as to prevent the vehicle hood from being opened. The hood latch 31 may be fastened to an insert nut 15 at the rear of the upper member 10. The insert nut 15 may be formed to be integrated with the plastic structure 12 at a central portion of the plastic structure 12 when the plastic structure 12 is formed by insert injection molding. The hood latch 31 has a structure configured to connect a central portion of the upper member 10 to a central portion of the front bumper beam, thereby making it possible to withstand high strength as compared with a carrier of a conventional front-end module frame.

Figure 5:
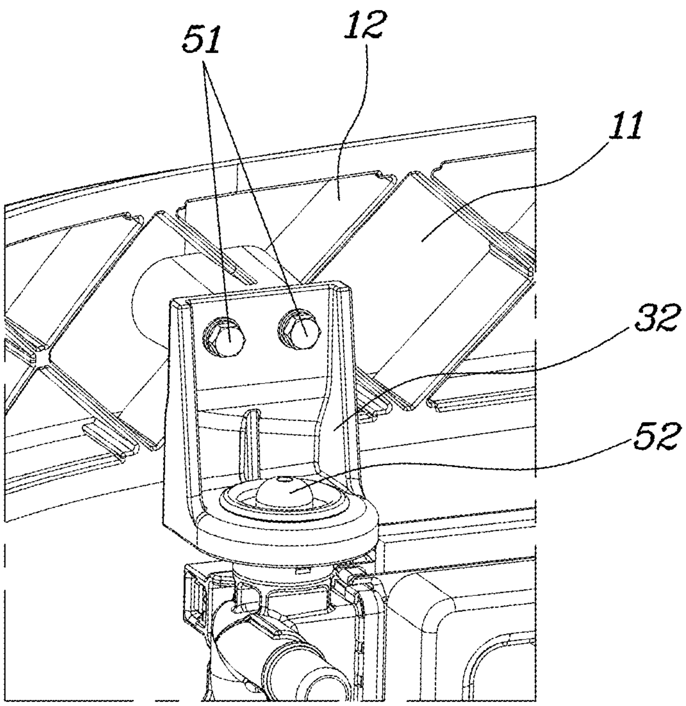
FIG. 5 is an enlarged view of an area B in FIG. 3 according to the embodiment of the present disclosure.

FIG. 5 is an enlarged view of an area B in FIG. 3.

Referring to FIG. 5, an insulator may allow the radiator 40 to be connected to the upper member 10. Here, when an insulator 32 is fastened to the insert nut 15 formed to be integrated with a side portion of the plastic structure 12, an upper portion of the radiator 40 may be supported by the insulator 32. In this case, a fixing part 52 is provided on a lower portion of the insulator 32, and the lower portion thereof supports the upper portion of the radiator 40. Further, the fixing part 52 is formed of a rubber material so as to flexibly respond to impact in the event of vehicle frontal collision.

Figure 6:
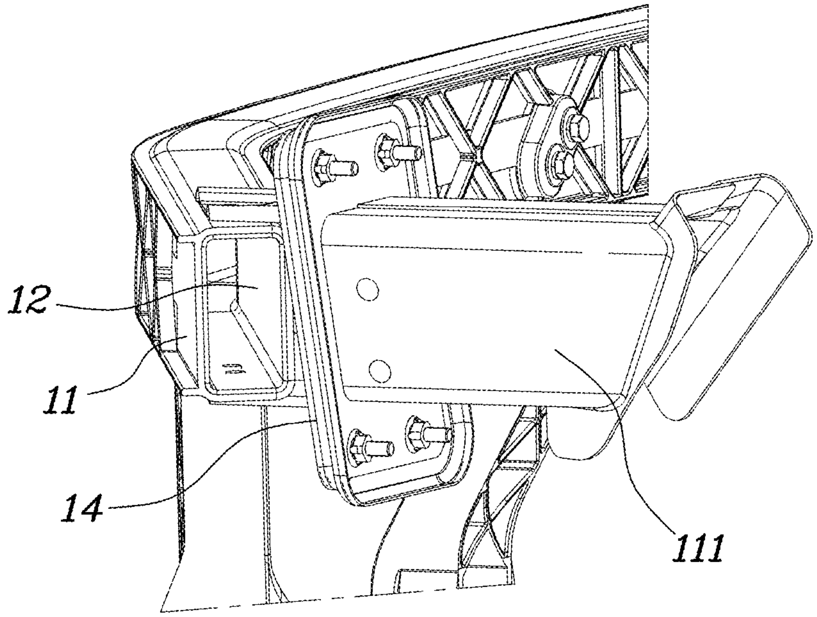
FIG. 6 is view showing connection between the upper member and a fender crash box according to an embodiment of the present disclosure.
Figure 7:
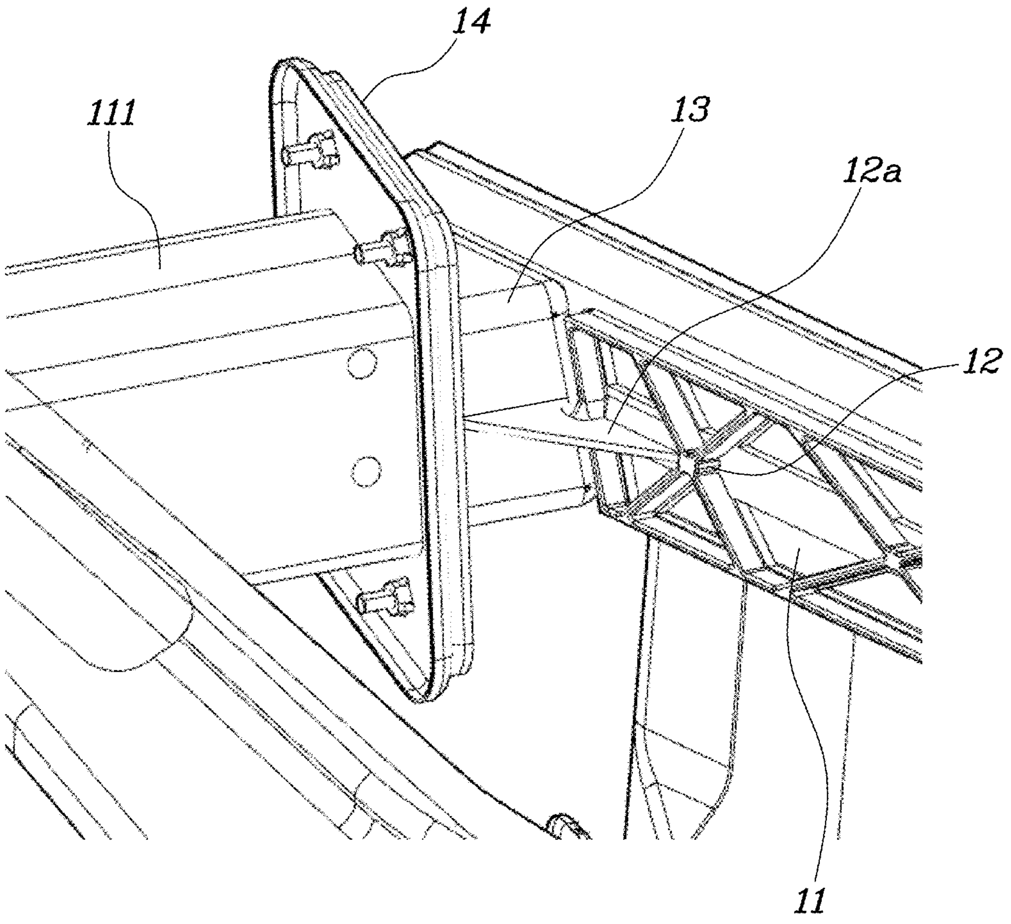
FIG. 7 is a view showing a reinforcing rib formed to extend in a plastic structure in one embodiment.

FIG. 6 shows connection between the upper member 10 and the fender crash box 111 according to the embodiment of the present disclosure, and FIG. 7 shows a reinforcing rib 12*a*.

Referring to FIG. 6, the upper crash box is formed to match the fender crash box 111 in the longitudinal direction of the vehicle, so that the plastic structure 12, the upper crash box, and the fender crash box 111 form a front load path. Through this configuration, it is possible to improve structural rigidity of the front-end module frame of the vehicle.

Referring to FIG. 7, the plastic structure 12, the upper impact absorption part 13, and the upper flange part 14 are integrally injection-molded, and the reinforcing rib 12*a* is formed to extend in the plastic structure 12. Through the integrally injected structure, the number of parts may be reduced, and a load path against vehicle frontal collision may be more reliably formed.

Figure 8:
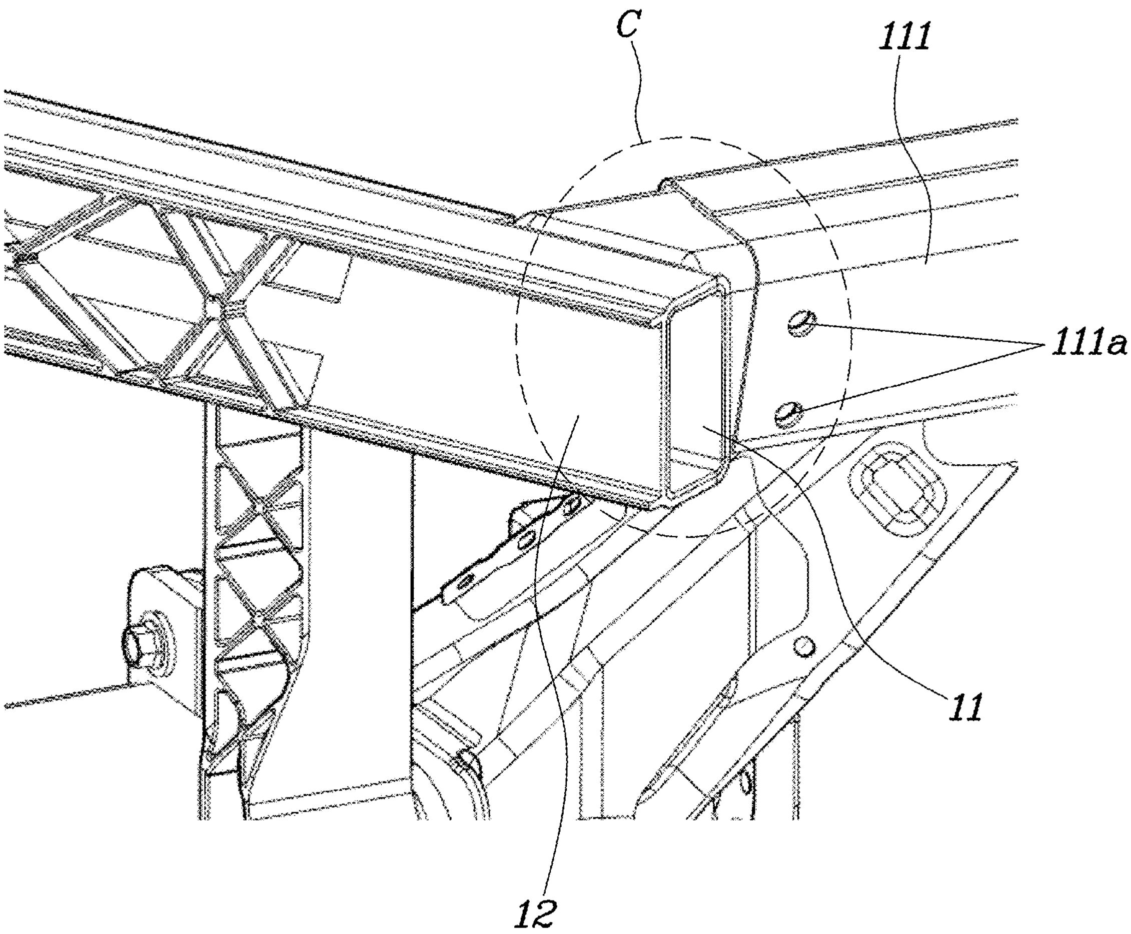
FIG. 8 is a view showing that the rear end of an upper crash box is inserted into the front end of the fender crash box according to an embodiment of the present disclosure.

FIG. 8 is a view showing that the rear end of the upper crash box according to the embodiment of the present disclosure is inserted into the front end of the fender crash box 111.

Referring to FIG. 8, the rear end of the upper crash box may be inserted into the front end of the fender crash box 111, and in this inserted state, the upper crash box may be bolted to the fender crash box 111 through a bolting hole 111*a* in the lateral direction of the fender crash box 111. Through this configuration, it is possible not only to reduce the number of parts by eliminating the configuration of the upper flange part 14, but also to improve productivity on the assembly line through lateral bolting.

According to the embodiments of the present disclosure described above, it is possible to secure a load path against vehicle frontal collision in a structure in which opposite ends of an upper member located at an upper portion of a front-end module frame of a vehicle are bent toward the vehicle side and connected to a fender apron member of the vehicle.

As is apparent from the above description, according to a front-end module frame of a vehicle of the present disclosure, it is possible to secure a load path against vehicle frontal collision in a structure in which opposite ends of an upper member located at an upper portion of the front-end module frame of the vehicle are bent toward the vehicle and connected to a fender apron member of the vehicle.

The effects obtainable in the present disclosure are not limited to the above-mentioned effects, and other effects not yet mentioned may be clearly understood by those of ordinary skill in the art to which the present disclosure pertains from the above descriptions.

Although some embodiments of the present disclosure have been disclosed for illustrative purposes, those having ordinary skill in the art should appreciate that various modifications, additions, and substitutions are possible, without departing from the scope and spirit of the present disclosure.

What is claimed is:

1. A front-end module frame of a vehicle, the front-end module frame comprising:

a front bumper beam formed to extend in a width direction of the vehicle, wherein the front bumper beam has opposite ends respectively connected to front ends of front side members of the vehicle;

an upper member formed to extend above the front bumper beam in the width direction of the vehicle, wherein the upper member includes a plastic structure covering a steel closed cross-section member; and a plurality of connection brackets connected to the front bumper beam in a height direction of the vehicle, wherein one of the connection brackets is formed to extend downwards from a central portion of the upper member and the rest of the connection brackets are respectively formed to extend downwards from side portions thereof, and wherein the connection bracket formed to extend from the central portion is bolted to front and upper surfaces of the front bumper beam, and the connection brackets respectively formed to extend from the side portions are bolted to upper and side surfaces of the front bumper beam.

2. The front-end module frame according to claim 1, further comprising:

a lower member disposed at a lower portion of a front side of the vehicle and formed to extend in the width direction of the vehicle, wherein the lower member has opposite ends respectively connected to front ends of a front subframe of the vehicle, wherein the front bumper beam is connected to the lower member in the height direction of the vehicle.

3. The front-end module frame according to claim 1, wherein each connection part of the front bumper beam is connected to a corresponding one of the front ends of the front side members so as to face each other, thereby enabling the front bumper beam and the front side members to form a front load path.

4. The front-end module frame according to claim 1, wherein the upper member has opposite ends bent toward a vehicle side and respectively connected to fender apron members of the vehicle.

5. The front-end module frame according to claim 1, wherein the upper member includes the plastic structure which is injection-molded on the steel closed cross-section member using injection molding.

6. The front-end module frame according to claim 4, wherein each of the fender apron members has a front end connected to a corresponding one of upper crash boxes, wherein each of the upper crash boxes has a front end connected to a corresponding one of rear surfaces on opposite ends of the plastic structure.

7. The front-end module frame according to claim 6, wherein the upper crash boxes are formed of an upper impact absorption part having a columnar shape and an upper flange part formed at a rear end of the upper impact absorption part, and the upper flange part is connected to the front end of the fender apron member.

8. The front-end module frame according to claim 7, wherein the plastic structure, the upper impact absorption part, and the upper flange part are integrally injection molded.

9. The front-end module frame according to claim 6, wherein each of the upper crash boxes is aligned with a corresponding one of fender crash boxes in a longitudinal direction of the vehicle, thereby enabling the plastic structure, the upper crash boxes, and the fender crash boxes to form a front load path.

10. The front-end module frame according to claim 9, wherein each of the upper crash boxes has a rear end inserted into a corresponding one of front ends of the fender crash boxes, and the rear end is bolted laterally in a state of being inserted into the front end.

11. The front-end module frame according to claim 2, further comprising:

an insulator configured to allow a radiator to be connected to each of the lower member and the upper member, wherein the radiator is configured to dissipate heat generated by the vehicle and is disposed behind the front bumper beam.

12. The front-end module frame according to claim 11, wherein the plastic structure has an insert nut formed to be integrated with a side portion thereof, and an upper portion of the radiator is supported when the insulator is fastened to the insert nut.

13. The front-end module frame according to claim 11, wherein the plastic structure has an insert nut formed to be integrated with a central portion thereof, and a vehicle hood is fixed to a hood latch and supported from below when the hood latch is fastened to the insert nut.

14. A front-end module frame of a vehicle, the front-end module frame comprising:

a front bumper beam formed to extend in a width direction of the vehicle, wherein the front bumper beam has opposite ends respectively connected to front ends of front side members of the vehicle; and an upper member formed to extend above the front bumper beam in the width direction of the vehicle, wherein the upper member includes a plastic structure covering a steel closed cross-section member, wherein the upper member has opposite ends bent toward a vehicle side and respectively connected to fender apron members of the vehicle, and wherein each of the fender apron members has a front end connected to a corresponding one of upper crash boxes, wherein each of the upper crash boxes has a front end connected to a corresponding one of rear surfaces on opposite ends of the plastic structure.

15. The front-end module frame according to claim 14, wherein the upper crash boxes are formed of an upper impact absorption part having a columnar shape and an upper flange part formed at a rear end of the upper impact absorption part, and the upper flange part is connected to the front end of the fender apron member.

16. The front-end module frame according to claim 15, wherein the plastic structure, the upper impact absorption part, and the upper flange part are integrally injection molded.

17. The front-end module frame according to claim 14, wherein each of the upper crash boxes is aligned with a corresponding one of fender crash boxes in a longitudinal direction of the vehicle, thereby enabling the plastic structure, the upper crash boxes, and the fender crash boxes to form a front load path.

* * * * *